United States Patent
Liang et al.

(10) Patent No.: US 10,116,546 B2
(45) Date of Patent: Oct. 30, 2018

(54) OAM PACKET PROCESSING METHOD, NETWORK DEVICE, AND NETWORK SYSTEM

(71) Applicant: Huawei Technologies Co., Ltd., Shenzhen (CN)

(72) Inventors: Jianyao Liang, Hangzhou (CN); Huibin Luo, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 107 days.

(21) Appl. No.: 15/284,696

(22) Filed: Oct. 4, 2016

(65) Prior Publication Data

US 2017/0026269 A1   Jan. 26, 2017

Related U.S. Application Data

(63) Continuation of application No. PCT/CN2014/074808, filed on Apr. 4, 2014.

(51) Int. Cl.
*H04L 12/26* (2006.01)

(52) U.S. Cl.
CPC .......... *H04L 43/18* (2013.01); *H04L 43/0817* (2013.01); *H04L 43/0876* (2013.01); *H04L 43/10* (2013.01); *H04L 43/0811* (2013.01)

(58) Field of Classification Search
CPC ......... H04L 43/08; H04L 45/28; H04W 24/08
See application file for complete search history.

(56) References Cited

U.S. PATENT DOCUMENTS

| | | | |
|---|---|---|---|
| 8,279,759 | B1 | 10/2012 | Jones |
| 2008/0031146 | A1 | 2/2008 | Kwak et al. |
| 2009/0232005 | A1 | 9/2009 | Mohan et al. |

FOREIGN PATENT DOCUMENTS

| | | |
|---|---|---|
| CN | 1815970 A | 8/2006 |
| CN | 101471813 A | 7/2009 |
| CN | 101897151 A | 11/2010 |
| CN | 102347905 A | 2/2012 |
| EP | 2884697 A1 | 6/2015 |
| WO | 2009049292 A1 | 4/2009 |

(Continued)

OTHER PUBLICATIONS

Machine Translation and Abstract of International Publication No. WO2014019348, Feb. 6, 2014, 36 pages.

(Continued)

*Primary Examiner* — Shukri Taha
(74) *Attorney, Agent, or Firm* — Conley Rose, P.C.

(57) ABSTRACT

An operations, administration, and maintenance (OAM) packet processing method, a network device, and a network system are provided. The method includes receiving a first Internet Protocol (IP) packet, where the first IP packet includes an OAM packet, an IP packet header of the OAM packet includes a first source device identifier (ID) and a first sink device ID, and returning a second IP packet to reply to the OAM packet, where the second IP packet includes an OAM reply packet, an IP packet header of the OAM reply packet includes a second source device ID, a second sink device ID, and a second packet type, the second source device ID is an ID of a local network device, and the second sink device ID is the same as the first source device ID. An IP packet header may be used to carry OAM information, which improves a fault detection capability in an OAM method.

20 Claims, 6 Drawing Sheets

(56) References Cited

FOREIGN PATENT DOCUMENTS

| WO | 2014019348 A1 | 2/2014 |
| WO | 2014048136 A1 | 4/2014 |

OTHER PUBLICATIONS

"Part 3: Carrier Sense Multiple Access with Collision Detection (CSMA/CD) Access Method and Physical Layer Specifications, Amendment: Media Access Control Parameters, Physical Layers, and Management Parameters for Subscriber Access Networks," IEEE Standards, 802.3ah, Sep. 7, 2004, 640 pages.

"Virtual Bridged Local Area Networks, Amendment 5: Connectivity Fault Management," IEEE Std 802.1ag, Dec. 17, 2007, 260 pages.

"Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet Protocol Aspects—Operation, administration and maintenance, OAM functions and mechanisms for Ethernet based networks," ITU-T, G.8013/Y.1731, Nov. 2013, 99 pages.

"Series G: Transmission Systems and Media, Digital Systems and Networks, Packet over Transport aspects—Ethernet over Transport aspects, Series Y: Global Information Infrastructure, Internet Protocol Aspects and Next-Generation Networks, Internet protocol aspects—Operation, administration and maintenance, OAM functions and mechanisms for Ethernet based networks," ITU-T, G.8013/Y.1731, Jul. 2011, 92 pages.

"Understanding the Ping and Traceroute Commands," XP55052448, Tech Notes, Cisco Systems, Jan. 2010, 22 pages.

"D1.2 OpenFlow," XP55325237, Dec. 2011, 10 pages.

Foreign Communication From a Counterpart Application, European Application No. 14887910.9, Extended European Search Report dated Dec. 13, 2016, 47 pages.

Foreign Communication From a Counterpart Application, PCT Application No. PCT/CN2014/074808, English Translation of International Search Report dated Jan. 8, 2015, 2 pages.

Foreign Communication From a Counterpart Application, PCT Application No. PCT/CN2014/074808, English Translation of Written Opinion dated Jan. 8, 2015, 5 pages.

Machine Translation and Abstract of Chinese Publication No. CN1815970, Aug. 9, 2006, 10 pages.

Foreign Communication From a Counterpart Application, Chinese Application No. 201480000456.6, Chinese Office Action dated Mar. 2, 2018, 6 pages.

OAM PACKET PROCESSING METHOD, NETWORK DEVICE, AND NETWORK SYSTEM

CROSS-REFERENCE TO RELATED APPLICATION

This application is a continuation of International Application No. PCT/CN2014/074808, filed on Apr. 4, 2014, the disclosure of which is hereby incorporated by reference in its entirety.

TECHNICAL FIELD

The present disclosure relates to the field of communications technologies, and in particular, to an operation, administration, and maintenance (OAM) packet processing method, a network device, and a network system.

BACKGROUND

Network management work is generally classified into three types: operation, administration, and maintenance, which are OAM for short.

Main functions of the OAM may include OAM capability negotiation between two parties of a session, link connectivity monitoring and path tracking, fault indication, a loopback test, detection on performance such as a delay and a packet loss rate, and the like.

An OAM packet is generally transferred using a special Ethernet type and a special destination Media Access Control (MAC) address or port, so as to implement OAM detection. For example, using Ethernet OAM technologies, administration and maintenance capabilities for the Ethernet can be efficiently improved, and stable running of a network can be ensured. The Ethernet OAM technologies are implemented level by level, and are classified into the following two levels: a link-level Ethernet OAM technology and a network-level Ethernet OAM technology.

The link-level Ethernet OAM technology is mainly applied to monitoring a status of a link between a user network and an operator network. A typical protocol is the Ethernet in the First Mile OAM (EFM OAM) protocol.

Meanings of important fields in an EFM OAM packet are shown in the following table 1.

TABLE 1

| Field | Meaning |
|---|---|
| Destination (Dest) Address (addr) | Destination MAC address, which is a slow protocol multicast address: 0x0180-C200-0002 |
| Source addr | Source MAC address, which is a MAC address of an interface at a transmit end |
| Type | Ethernet protocol type, which is 0x8809 |

It may be learned that a special destination Media Access Control (MAC) address and a specified Ethernet protocol type (EtherType) are used in the EFM OAM packet.

The network-level Ethernet OAM technology is mainly applied at an access layer and a convergence layer that are of a network, and is used to monitor connectivity of the entire network and locate a connectivity fault of the network. A typical protocol is the connectivity fault management (CFM) protocol.

Meanings of important fields in a CFM OAM packet are shown in the following table 2.

TABLE 2

| Field | Meaning |
|---|---|
| Dest MAC | Destination MAC address |
| Src MAC | Source MAC address |
| EtherType | Ethernet protocol type, which is 0x8902 |

It may be learned from the foregoing table that a specified Ethernet protocol type is used in the CFM OAM packet.

For another example, bidirectional forwarding detection (BFD) is used for packet transfer based on the User datagram protocol (UDP), and a special destination port number is used in an OAM packet of the BFD to implement OAM detection. A special EtherType and a special destination MAC address were used in an EFM OAM packet, a special EtherType is used in a CFM OAM packet, and a special destination port number is used in a BFD packet, which means that the ETH OAM packet and a service packet have different EtherType and destination MAC addresses, the CFM OAM packet and the service packet have different EtherType, and the BFD packet and the service packet have different destination port numbers. If a network device includes a forwarding entry that matches EtherType, destination MAC address, or a destination port number of the service packet, the service packet matches a corresponding forwarding entry, but the OAM packet does not match a corresponding forwarding entry. That is, for an OAM packet in a traditional network, a routing switch subunit is bypassed in the network device, and different forwarding entries are used in a service path. Therefore, a complete forwarding path consistent with a traffic flow cannot be detected. For example, OPENFLOW is used as a protocol for implementing software-defined networking (SDN), and separation of a data forwarding layer from a control layer is implemented on an OPENFLOW network. An OPENFLOW switch is mainly responsible for data forwarding: after receiving a data packet, the OPENFLOW switch performs matching on a flow table entry in a flow table, where the flow table entry is used to indicate a method for processing the data packet by the switch, and forwards the data packet according to a matched flow table entry. If the OPENFLOW switch includes flow table entries that match EtherType and destination MAC address that are of a service packet, the service packet matches a corresponding flow table entry, but an OAM packet does not match the corresponding flow table entry. That is, different flow table entries are used in the OAM packet and the service packet. Therefore, a complete forwarding path consistent with a traffic flow cannot be detected. The OPENFLOW switch has multiple matching fields that can be flexibly combined, thereby causing a higher probability of this problem.

If a traffic flow is a packet at an Internet Protocol (IP) layer or a level upper than IP layer, when an error occurs in a single forwarding entry (which, for example, matches a service packet whose port number is 8080 in the Transmission Control Protocol (TCP) protocol, to forward the service packet to a specific path) on the network device, and another forwarding entry and other software and hardware subunits function properly, a fault occurs in the service packet related to the forwarding entry. Because a forwarding entry that matches an OAM packet is different from a forwarding entry that matches the service packet, a fault may not occur in the OAM packet, and this type of fault cannot be detected using an OAM method in the prior art.

SUMMARY

Embodiments of the present disclosure provide an OAM packet processing method, a network device, and a network system, which can improve a fault detection capability in an OAM method.

A first aspect of the present disclosure provides an OAM packet processing method, where the method includes receiving a first IP packet, where the first IP packet includes an OAM packet, an IP packet header of the OAM packet includes first OAM information, and the first OAM information includes a first source device identity (ID) and a first sink device ID, and returning a second IP packet to reply to the OAM packet, where the second IP packet includes an OAM reply packet, an IP packet header of the OAM reply packet includes second OAM information corresponding to the first OAM information, the second OAM information includes a second source device ID and a second sink device ID, the second source device ID is an ID of a local network device, and the second sink device ID is the same as the first source device ID.

With reference to the first aspect, in a first possible implementation manner, before the returning a second IP packet, the method further includes determining whether the OAM packet meets a preset reply condition, and the returning a second IP packet is if the OAM packet meets the preset reply condition, returning the second IP packet, where the second OAM information further includes a second packet type, and the second packet type is an OAM detection reply packet, where the first OAM information further includes a first packet type, and the preset reply condition includes the first sink device ID is the same as the ID of the local network device and the first packet type is an OAM detection packet.

With reference to the first possible implementation manner of the first aspect, in a second possible implementation manner, the method further includes forwarding the OAM packet if the OAM packet does not meet the preset reply condition.

With reference to the second possible implementation manner of the first aspect, in a third possible implementation manner, before the forwarding the OAM packet, the method further includes determining whether the OAM packet meets a preset forwarding condition, and if the OAM packet meets the preset forwarding condition, forwarding the OAM packet.

With reference to the third possible implementation manner of the first aspect, in a fourth possible implementation manner, the first OAM information further includes a first forwarding count value, the preset forwarding condition includes the first forwarding count value is greater than a preset first threshold and the first sink device ID is not the ID of the local network device, and the forwarding the OAM packet includes subtracting a fixed value from the first forwarding count value, and forwarding the OAM packet.

A second aspect of the present disclosure provides a network device, including a receiving unit configured to receive a first IP packet, where the first IP packet includes an OAM packet, an IP packet header of the OAM packet includes first OAM information, and the first OAM information includes a first source device ID and a first sink device ID, and a reply unit, configured to return a second IP packet to reply to the OAM packet, where the second IP packet includes an OAM reply packet, an IP packet header of the OAM reply packet includes second OAM information corresponding to the first OAM information, the second OAM information includes a second source device ID and a second sink device ID, the second source device ID is an ID of the local network device, and the second sink device ID is the same as the first source device ID.

With reference to second aspect, in a first possible implementation manner, the network device further includes a first determining unit configured to determine whether the OAM packet meets a preset reply condition, and the reply unit is configured to, when the OAM packet meets the preset reply condition, return the second IP packet, where the second OAM information further includes a second packet type, and the second packet type is an OAM detection reply packet, where the first OAM information further includes a first packet type, and the preset reply condition includes the first sink device ID is the same as the ID of the local network device and the first packet type is an OAM detection packet.

With reference to the first possible implementation manner of the second aspect, in a second possible implementation manner, the network device further includes a forwarding unit configured to, when the OAM packet does not meet the preset reply condition, forward the OAM packet.

With reference to the second possible implementation manner of the second aspect, in a third possible implementation manner, the network device further includes a second determining unit configured to determine whether the OAM packet meets a preset forwarding condition, and the forwarding unit is configured to, when the OAM packet meets the preset forwarding condition, forward the OAM packet.

With reference to the third possible implementation manner of the second aspect, in a fourth possible implementation manner, the first OAM information further includes a first forwarding count value, the preset forwarding condition includes the first forwarding count value is greater than a preset first threshold and the first sink device ID is not the ID of the local network device, and the forwarding unit is configured to subtract a fixed value from the first forwarding count value, and forward the OAM packet.

A third aspect of the present disclosure provides a network device, including a processor and a memory that are connected to a bus, where the memory is configured to store an execution instruction, and the processor is configured to communicate with the memory, and execute the execution instruction such that the network device executes the following method: receiving a first IP packet, where the first IP packet includes an OAM packet, an IP packet header of the OAM packet includes first OAM information, and the first OAM information includes a first source device ID and a first sink device ID, and returning a second IP packet to reply to the OAM packet, where the second IP packet includes an OAM reply packet, an IP packet header of the OAM reply packet includes second OAM information corresponding to the first OAM information, the second OAM information includes a second source device ID, a second sink device ID, and a second packet type, the second source device ID is an ID of the local network device, and the second sink device ID is the same as the first source device ID.

With reference to the third aspect, in a first possible implementation manner, before the returning a second IP packet, the method executed by the network device further includes determining whether the OAM packet meets a preset reply condition, and the returning a second IP packet is, if the OAM packet meets the preset reply condition, returning the second IP packet, where the second OAM information further includes a second packet type, and the second packet type is an OAM detection reply packet, where the first OAM information further includes a first packet type, and the preset reply condition includes the first sink device ID is the same as the ID of the local network device and the first packet type is an OAM detection packet.

With reference to the first possible implementation manner of the first aspect, in a second possible implementation manner, the method further includes forwarding the OAM packet if the OAM packet does not meet the preset reply condition.

With reference to the second possible implementation manner of the first aspect, in a third possible implementation manner, before the forwarding the OAM packet, the method further includes determining whether the OAM packet meets a preset forwarding condition, and if the OAM packet meets the preset forwarding condition, forwarding the OAM packet.

With reference to the third possible implementation manner of the first aspect, in a fourth possible implementation manner, the first OAM information further includes a first forwarding count value, the preset forwarding condition includes the first forwarding count value is greater than a preset first threshold and the first sink device ID is not the ID of the local network device, and the forwarding the OAM packet includes subtracting a fixed value from the first forwarding count value, and forwarding the OAM packet.

A fourth aspect of the present disclosure provides a network system, where the system includes at least two network devices according to any possible implementation manner of the second aspect.

It may be learned from the foregoing content that in the embodiments of the present disclosure, an IP packet header of an OAM packet is used to carry OAM information, no special Ethernet protocol type or special destination MAC address or special destination port number is used in the OAM packet. Therefore, at a link layer, a network layer, a transport layer, and an application layer, the IP packet header of the IP packet of the OAM packet is the same as that of an IP packet that carries a service packet. In a forwarding path (such as a switch and a router), an identical forwarding entry is used in the OAM packet and the service packet, and if an error occurs in a forwarding entry related to the service packet, a same fault occurs in the OAM packet and the service packet. The fault can be quickly detected using an OAM mechanism, which, when compared with the prior art, can improve a fault detection capability in an OAM method.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can, for example, be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
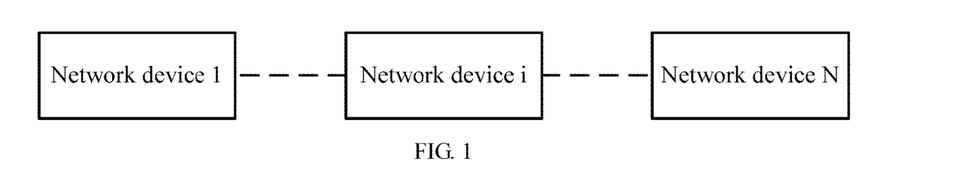
FIG. 1 is a schematic connection diagram of network devices in a network system according to an embodiment of the present disclosure.

Referring to FIG. 1, FIG. 1 is a schematic diagram of a network system according to an embodiment of the present disclosure. The network system in the figure may include at least two communicatively connected network devices. The at least two network devices may be network devices that have a same function, and each of the at least two network devices can implement functions such as initiating, receiving, forwarding, and replying to an OAM session (packet). In an embodiment, some of the network devices may support only some OAM session functions.

The network devices mentioned in this embodiment of the present disclosure may include network devices such as a switch and a router.

Figure 2:
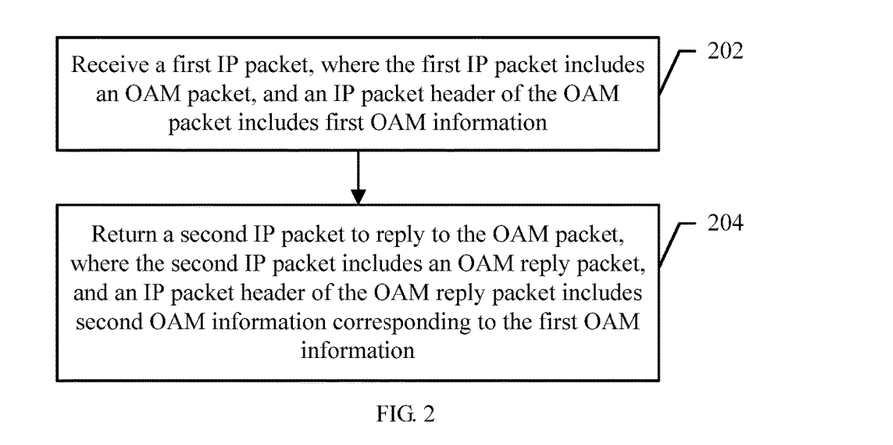
FIG. 2 is a first schematic flowchart of an OAM packet processing method according to an embodiment of the present disclosure.

FIG. 2 is a schematic flowchart of an OAM packet processing method according to an embodiment of the present disclosure. The OAM packet processing method may be executed by any possible network device in a network system. As shown in FIG. 2, the method may include the following steps.

202. Receive a first IP packet, where the first IP packet includes an OAM packet, and an IP packet header of the OAM packet includes a first OAM information.

The first OAM information may include a first source device ID and a first sink device ID.

204. Return a second IP packet to reply to the OAM packet, where the second IP packet includes an OAM reply packet, and an IP packet header of the OAM reply packet includes second OAM information corresponding to the first OAM information.

The second OAM information may include a second source device ID and a second sink device ID, where the second source device ID is an ID of a local network device, and the second sink device ID is the same as the first source device ID. In this embodiment, the local network device may be a network device that executes the foregoing method, and when a network device executes the foregoing method, the network device may be considered as the local network device.

According to the OAM packet processing method provided in this embodiment, OAM information in an OAM packet is filled in an IP packet header so that an IP packet is used to carry the OAM information, no special Ethernet protocol type or special destination MAC address or special destination port number is used in the OAM packet. Therefore, at a link layer, a network layer, a transport layer, and an application layer, the IP packet header of the IP packet of the OAM packet is the same as that of an IP packet that carries a service packet. In a forwarding path (such as a switch and a router), an identical forwarding entry is used in the OAM packet and the service packet, and if an error occurs in a forwarding entry related to the service packet, a same fault occurs in the OAM packet and the service packet. The fault can be quickly detected using an OAM mechanism, which overcomes a previous defect, thereby improving a fault detection capability in an OAM method.

Figure 3:
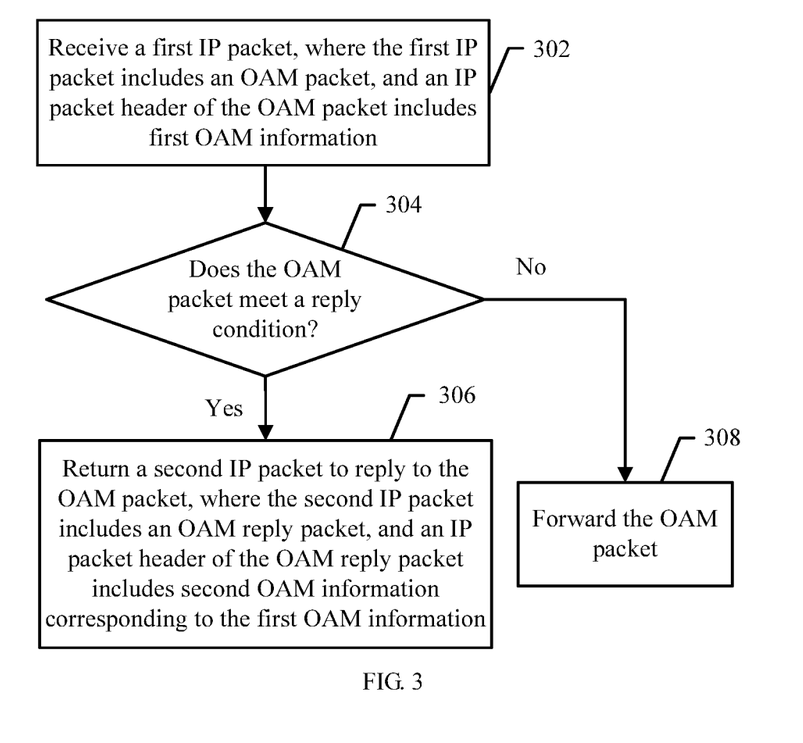
FIG. 3 is a second schematic flowchart of an OAM packet processing method according to an embodiment of the present disclosure.

FIG. 3 is a schematic flowchart of another OAM packet processing method according to an embodiment of the present disclosure. As shown in FIG. 3, the method may include the following steps:

302. Receive a first IP packet, where the first IP packet includes an OAM packet, and an IP packet header of the OAM packet includes first OAM information.

The first OAM information may include a first source device ID, a first sink device ID, and a first packet type.

In an embodiment, because the IP packet header includes some optional fields (options), the optional fields may be used to carry the first OAM information. That is, the optional fields in the IP packet header of the OAM packet includes the first OAM information.

304. Determine whether the OAM packet meets a preset reply condition, and if the OAM packet meets the preset reply condition, execute step 306, or if the OAM packet does not meet the preset reply condition, execute step 308.

For example, the preset reply condition may include the first sink device ID is the same as an ID of a local network device and the first packet type is an OAM detection packet.

For example, the OAM detection packet may include OAM packets such as a connectivity detection packet, a bidirectional delay detection packet, a loopback detection packet, a tracking detection packet, and a packet loss detection packet.

306. Return a second IP packet to reply to the OAM packet, where the second IP packet includes an OAM reply packet, and an IP packet header of the OAM reply packet includes second OAM information corresponding to the first OAM information. The procedure ends.

The second OAM information may include a second source device ID, a second sink device ID, and a second packet type, where the second source device ID is the ID of the local network device, the second sink device ID is the same as the first source device ID, and the second packet type is an OAM detection reply packet.

For example, the OAM detection reply packet may include OAM packets such as a connectivity detection reply packet, a bidirectional delay detection reply packet, a loopback detection reply packet, a tracking detection reply packet, and a packet loss detection reply packet. In addition, the second packet type is corresponding to the first packet type, for example, if the first packet type is a loopback detection packet, the second packet type is a loopback detection reply packet.

308. Forward the OAM packet.

Figure 4:
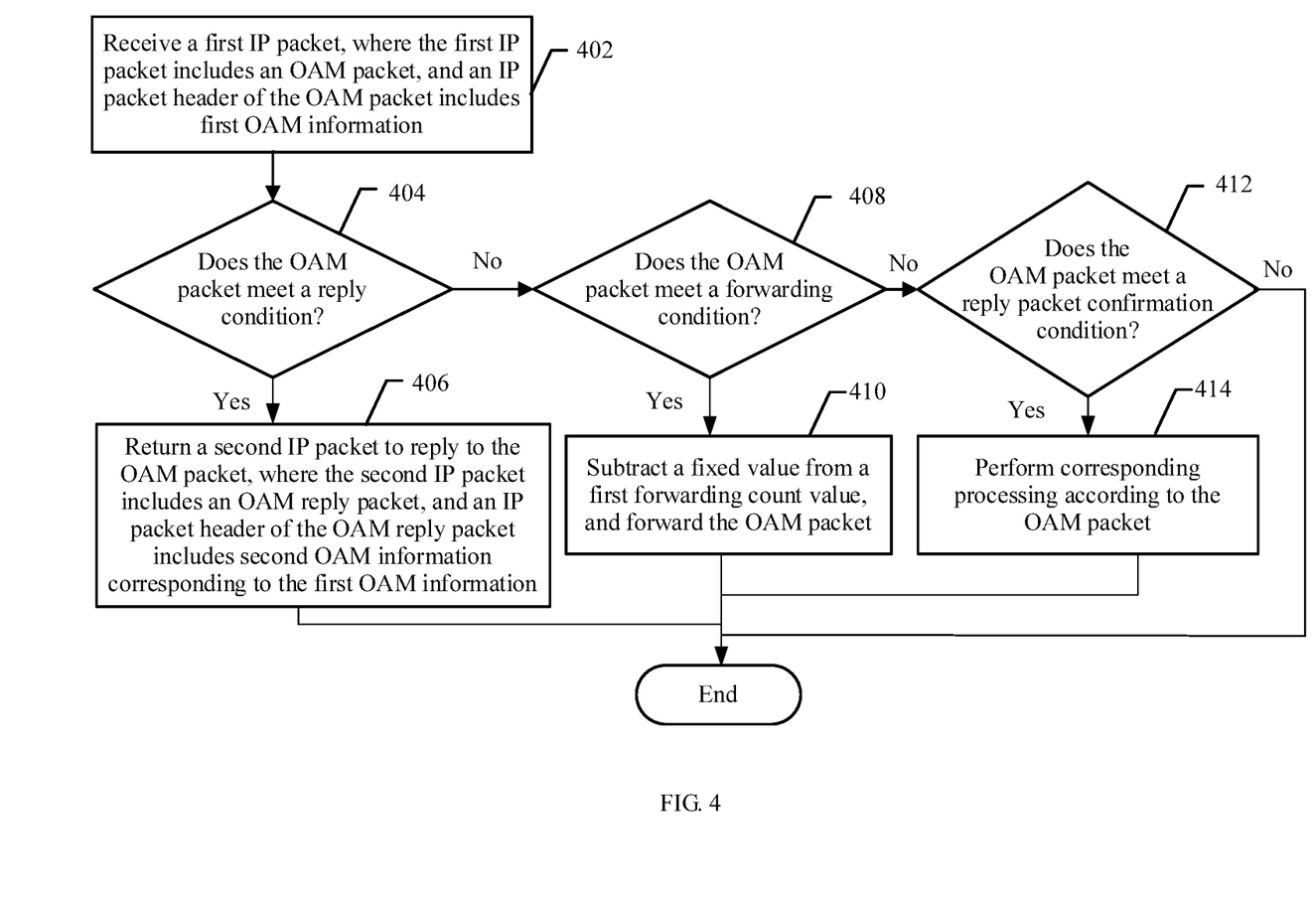
FIG. 4 is a third schematic flowchart of an OAM packet processing method according to an embodiment of the present disclosure.

FIG. 4 is a schematic flowchart of another OAM packet processing method according to an embodiment of the present disclosure. As shown in FIG. 4, the method may include the following steps.

402. Receive a first IP packet, where the first IP packet includes an OAM packet, and an IP packet header of the OAM packet includes first OAM information.

The first OAM information may include a first source device ID, a first sink device ID, a first packet type, and a first forwarding count value.

In step 402, the first IP packet received by a local network device may be from an OAM detection session initiated by one of network devices in a network system. When initiating the OAM detection session, the network device fills the first OAM information in the IP packet header of the OAM packet.

404. Determine whether the OAM packet meets a preset reply condition, and if the OAM packet meets the preset reply condition, execute step 406, or if the OAM packet does not meet the preset reply condition, execute step 408.

For example, the preset reply condition may include the first sink device ID is the same as an ID of the local network device and the first packet type is an OAM detection packet.

For example, the preset reply condition may further include the first forwarding count value is less than or equal to a preset first threshold, and the OAM packet is a tracking packet.

For example, the OAM detection packet may include OAM packets such as a connectivity detection packet, a bidirectional delay detection packet, a loopback detection packet, a tracking detection packet, and a packet loss detection packet.

406. Return a second IP packet to reply to the OAM packet, where the second IP packet includes an OAM reply packet, and an IP packet header of the OAM reply packet includes second OAM information corresponding to the first OAM information. The procedure ends.

The second OAM information may include a second source device ID, a second sink device ID, a second packet type, and a second forwarding count value, where the second source device ID is the ID of the local network device, the second sink device ID is the same as the first source device ID, the second packet type is an OAM detection reply packet, and the second forwarding count value may be a preset initial value (which may be but is not limited to, for example, 255).

For example, the OAM detection reply packet may include OAM packets such as a connectivity detection reply packet, a bidirectional delay detection reply packet, a loopback detection reply packet, a tracking detection reply packet, and a packet loss detection reply packet. In addition, the second packet type is corresponding to the first packet type, for example, if the first packet type is a loopback detection packet, the second packet type is a loopback detection reply packet.

408. Determine whether the OAM packet meets a preset forwarding condition, and if the OAM packet meets the preset forwarding condition, execute step 410, or if the OAM packet does not meet the preset forwarding condition, execute step 412.

The preset forwarding condition may include the first forwarding count value is greater than a preset first threshold and the first sink device ID is not the ID of the local network device.

For example, the first threshold may be 0. In an embodiment, the first threshold may be another appropriate value such as 1 or 10.

410. Subtract a fixed value from the first forwarding count value, and forward the OAM packet. The procedure ends.

For example, the subtracted fixed value may be 1. In this case, after 1 is subtracted from the first forwarding count value in the first OAM information, the OAM packet is forwarded. Each time the OAM packet is forwarded by one network device, 1 is subtracted from the first forwarding count value carried in the first OAM information in the OAM packet, and forwarding times of the OAM packet may be controlled by combination of setting the first forwarding count value and setting the forwarding condition.

In an embodiment, the fixed value may be another appropriate value such as 2 or 5, and no specific limitation is imposed herein.

412. Determine whether the OAM packet meets a preset reply packet confirmation condition. If the OAM packet meets the preset reply packet confirmation condition, step 414 is executed, or if the OAM packet does not meet the preset reply packet confirmation condition, the procedure ends.

In an embodiment, the first OAM information may further include a first session identifier (ID). Correspondingly, the second OAM information may also include a second session ID. The second session ID may be the same as the first session ID.

The reply packet confirmation condition may include the first sink device ID is the same as the ID of the local network device, the first packet type is an OAM detection reply packet, and the first session ID is the same as a session ID included in the OAM detection packet initiated by the local network device.

414. Perform corresponding processing according to the OAM packet.

The local network device may initiate an OAM detection session, and fill corresponding first OAM information in an IP packet header of the OAM detection packet sent by the local network device, where the first OAM information may include the first session ID, and the first session ID is used to uniquely identify the OAM detection session. The local network device may record the first session ID of the OAM detection session initiated by the local network device.

When an OAM packet whose second sink device ID is the ID of the local network device and whose packet type is an OAM detection reply packet is received, a second session ID included in the OAM packet may be verified to determine whether the OAM packet is a reply packet for OAM detection session initiated by the local network device. If the OAM packet is a reply packet for the OAM detection session initiated by the local network device, corresponding processing may be performed according to information that is fed back in the OAM packet. For example, if the OAM packet is a connectivity detection reply packet and no timeout occurs, it may be determined that the network is normally connected, or if a timeout occurs, it may be determined that the network is in congestion or the network is faulty.

In an embodiment, the first OAM information may further include information such as an OAM version and OAM data. The local network device may further determine, according to the OAM version included in the first OAM information, whether the received OAM packet is supported, and when the received OAM packet is not supported, the local network device may discard the OAM packet.

Figure 5:
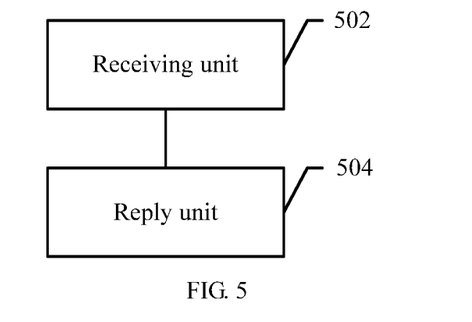
FIG. 5 is a first schematic structural diagram of a network device according to an embodiment of the present disclosure.

FIG. 5 is a schematic structural diagram of a network device according to an embodiment of the present disclosure. As shown in FIG. 5, a network device may include a receiving unit 502, configured to receive a first IP packet, where the first IP packet includes an OAM packet, an IP packet header of the OAM packet includes first OAM information, and the first OAM information includes a first source device ID and a first sink device ID, and a reply unit 504, configured to return a second IP packet to reply to the OAM packet, where the second IP packet includes an OAM reply packet, and an IP packet header of the OAM reply packet includes second OAM information corresponding to the first OAM information, the second OAM information includes a second source device ID and a second sink device ID, the second source device ID is an ID of the local network device, and the second sink device ID is the same as the first source device ID.

According to the network device provided in this embodiment, OAM information in an OAM packet processed by the network device is filled in an IP packet header so that an IP packet is used to carry the OAM information, no special Ethernet protocol type or special destination MAC address or special destination port number is used in the OAM packet, therefore, at a link layer, a network layer, a transport layer, and an application layer, the IP packet header of the IP packet of the OAM packet is the same as that of an IP packet that carries a service packet. In a forwarding path (such as a switch and a router), an identical forwarding entry is used in the OAM packet and the service packet, and if an error occurs in a forwarding entry related to the service packet, a same fault occurs in the OAM packet and the service packet. The fault can be quickly detected using an OAM mechanism, which overcomes a defect in the prior art, thereby improving a fault detection capability in an OAM method.

Figure 6:
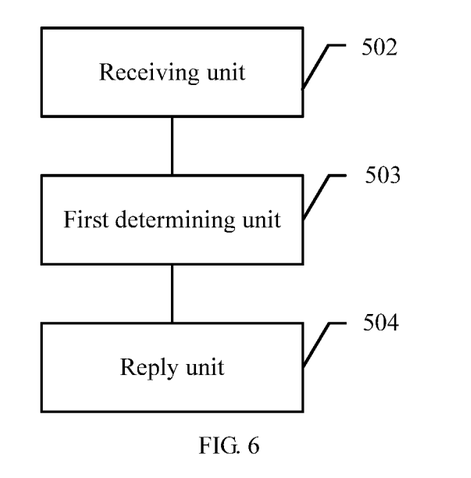
FIG. 6 is a second schematic structural diagram of a network device according to an embodiment of the present disclosure.

In an embodiment, as shown in FIG. 6, the network device may further include a first determining unit 503, configured to determine whether the OAM packet received by the receiving unit 502 meets a preset reply condition.

The reply unit 504 may reply to the OAM packet when the OAM packet meets the preset reply condition.

In an embodiment, the first OAM information may further include a first packet type.

For example, the preset reply condition may include the first sink device ID is the same as the ID of the local network device (the network device 500) and the first packet type is an OAM detection packet.

For example, the OAM detection packet may include OAM packets such as a connectivity detection packet, a bidirectional delay detection packet, a loopback detection packet, a tracking detection packet, and a packet loss detection packet.

For example, the second OAM information may further include a second packet type, and the second packet type is an OAM detection reply packet.

For example, the OAM detection reply packet may include OAM packets such as a connectivity detection reply packet, a bidirectional delay detection reply packet, a loopback detection reply packet, a tracking detection reply packet, and a packet loss detection reply packet. In addition, the second packet type is corresponding to the first packet type, for example, if the first packet type is a loopback detection packet, the second packet type is a loopback detection reply packet.

Figure 7:
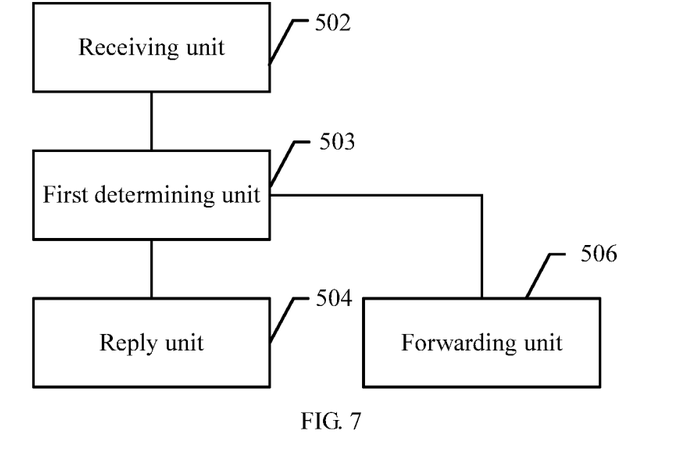
FIG. 7 is a third schematic structural diagram of a network device according to an embodiment of the present disclosure.

In an embodiment, as shown in FIG. 7, the network device may further include a forwarding unit 506. The forwarding unit 506 may be configured to, when the first determining unit 503 determines that the OAM packet does not meet the preset reply condition, forward the OAM packet.

In an embodiment, the first OAM information may further include a first forwarding count value. Correspondingly, the second OAM information may also include a second forwarding count value. The second forwarding count value may be a preset initial value such as 255 or another appropriate value.

In an embodiment, the preset reply condition may further include the first forwarding count value is less than or equal to a preset first threshold, and the OAM packet is a tracking packet.

For example, the first threshold may be 0. In an embodiment, the first threshold may be another appropriate value such as 1 or 10.

Figure 8:
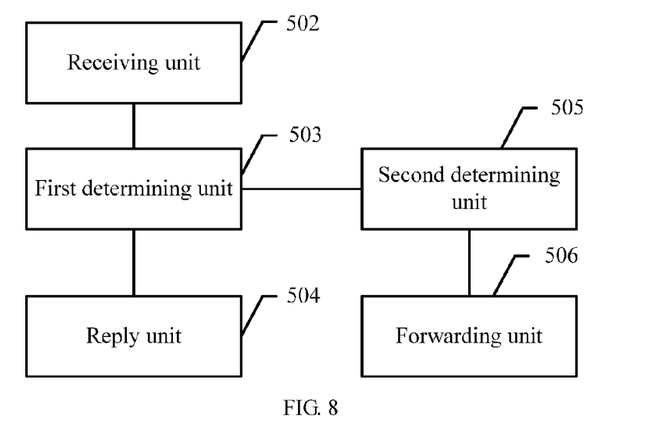
FIG. 8 is a fourth schematic structural diagram of a network device according to an embodiment of the present disclosure.

In an embodiment, as shown in FIG. 8, the network device may further include a second determining unit 505. The second determining unit 505 is configured to determine whether the OAM packet received by the receiving unit 502 meets a preset forwarding condition.

The forwarding unit 506 may be configured to, when the OAM packet meets the preset forwarding condition, forward the OAM packet.

For example, the preset forwarding condition may include the first forwarding count value is greater than the preset first threshold and the first sink device ID is not the ID of the local network device.

In an embodiment, the forwarding unit 506 may be configured to subtract a fixed value from the first forwarding count value, and forward the OAM packet.

For example, a specific value of the fixed value may be 1. In this case, each time the OAM packet is forwarded, 1 is subtracted from the first forwarding count value. In an embodiment, the fixed value may be another appropriate value, and no specific limitation is imposed herein.

In an embodiment, the first OAM information further includes a first session ID. Correspondingly, the second OAM information may also include a second session ID. The second session ID may be the same as the first session ID.

Figure 9:
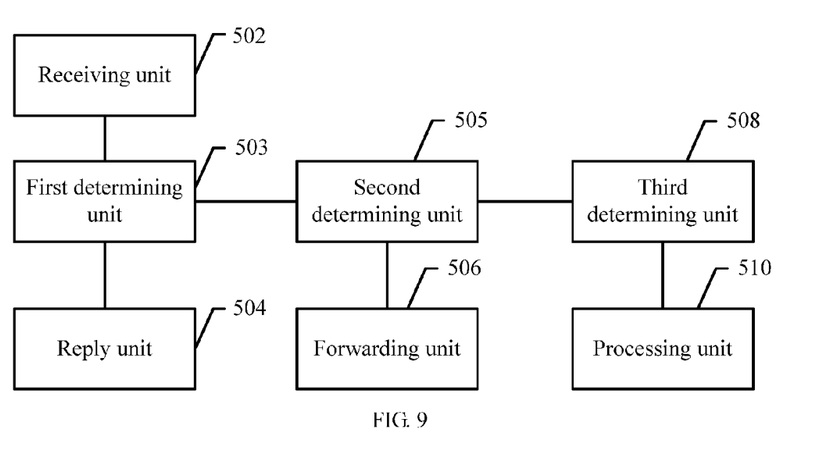
FIG. 9 is a fifth schematic structural diagram of a network device according to an embodiment of the present disclosure.

In an embodiment, as shown in FIG. 9, the network device may further include a third determining unit 508 and a processing unit 510. The third determining unit 508 is configured to determine whether the OAM packet received by the receiving unit 502 meets a preset reply packet confirmation condition. The processing unit 510 is configured to, when the OAM packet meets the preset reply packet confirmation condition, perform corresponding processing on the OAM packet, which includes determining network connectivity, network congestion, a network fault, and the like.

For example, the preset reply packet confirmation condition may include the first sink device ID is the same as the ID of the local network device, the first packet type is an OAM detection reply packet, and the first session ID is the same as a session ID included in the OAM detection packet initiated by the local network device.

Figure 10:
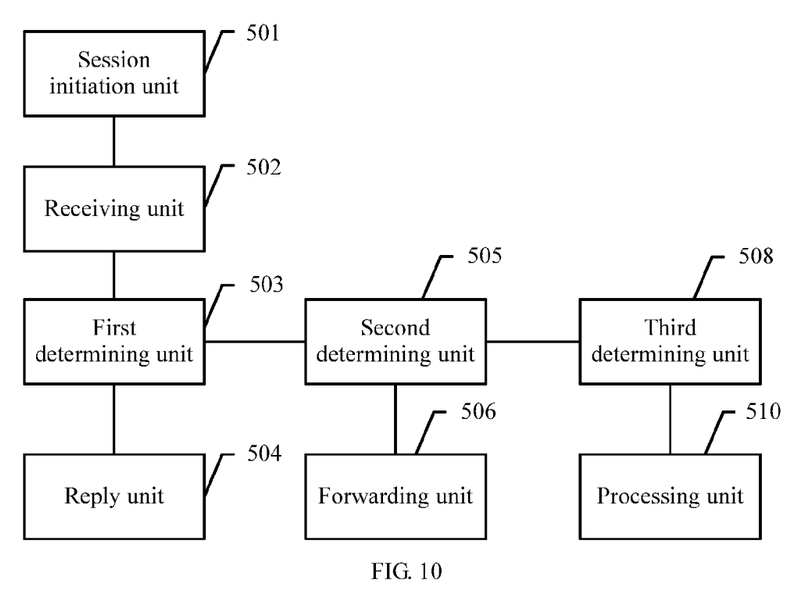
FIG. 10 is a sixth schematic structural diagram of a network device according to an embodiment of the present disclosure.

In this embodiment, as shown in FIG. 10, the network device may further include a session initiation unit 501, and the session initiation unit 501 may be configured to initiate an OAM detection session.

The session initiation unit 501 may include an OAM packet generation subunit, an OAM packet sending subunit, and a session ID recording subunit. The OAM packet generation subunit is configured to generate an OAM detection packet, and corresponding first OAM information is filled in an IP packet header of the OAM detection packet, where the first OAM information may include a first session ID, and the first session ID is used to uniquely identify an OAM detection session. The session ID recording subunit may record the first session ID of the OAM detection session initiated by the session initiation unit 501, and the OAM packet sending subunit may send the OAM detection packet generated by an OAM packet generation subunit.

After the receiving unit 502 receives an OAM packet, the second session ID included in the received OAM packet may be compared with the first session ID recorded by the network device 500 to determine whether the OAM packet is a reply packet for the OAM detection session initiated by the network device 500. If the OAM packet is a reply packet for the OAM detection session initiated by the network device 500, corresponding processing may be performed according to information that is in the OAM packet and is fed back. For example, if the OAM packet is a connectivity detection reply packet and no timeout occurs, it may be determined that the network is normally connected, or if a timeout occurs, it may be determined that the network is in congestion or the network is faulty.

In an embodiment, the first OAM information may further include information such as an OAM version and OAM data. The network device 500 may further determine, according to the OAM version included in the first OAM information, whether the received OAM packet is supported, and when the received OAM packet is not supported, the network device 500 may discard the OAM packet.

Figure 11:
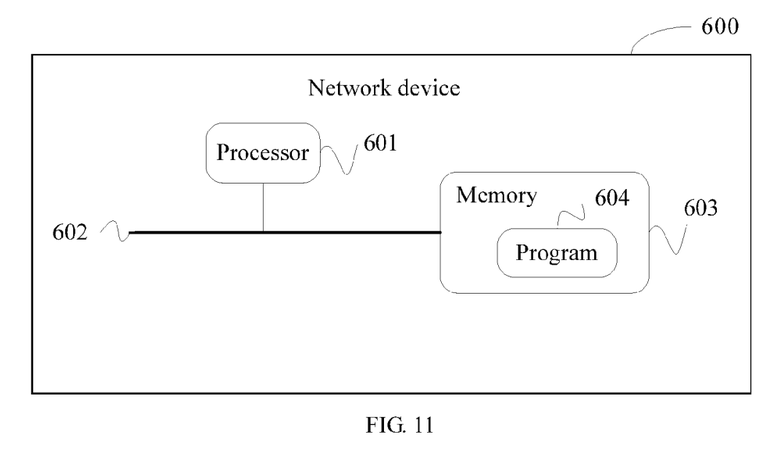
FIG. 11 is a seventh schematic structural diagram of a network device according to an embodiment of the present disclosure.

An embodiment of the present disclosure further provides a network device. As shown in FIG. 11, a network device 600 may include a processor 601 and a memory 603 that are connected to a bus 602.

The memory 603 may be configured to store an execution instruction. The memory 603 may store a program 604, where the program 604 may include program code, and the program code includes the execution instruction.

For example, the memory 603 may include a high-speed Random Access Memory (RAM), and may further include a non-volatile memory (non-volatile memory), for example, at least one disk memory.

The processor 601 may be configured to communicate with the memory 603, and execute the execution instruction such that the network device 600 executes the following method: receiving a first IP packet, where the first IP packet includes an OAM packet, an IP packet header of the OAM packet includes first OAM information, and the first OAM information may include a first source device ID and a first sink device ID, and returning a second IP packet to reply to the OAM packet, where the second IP packet includes an OAM reply packet, and an IP packet header of the OAM reply packet includes second OAM information corresponding to the first OAM information, the second OAM information may include a second source device ID and a second sink device ID, the second source device ID is an ID of the local network device, and the second sink device ID is the same as the first source device ID.

In an embodiment, before the returning a second IP packet, the method may further include determining whether the OAM packet meets a preset reply condition.

The returning a second IP packet is, if the OAM packet meets the preset reply condition, returning the second IP packet, where the second OAM information further includes a second packet type, and the second packet type is an OAM detection reply packet.

The first OAM information further includes a first packet type, and the preset reply condition includes the first sink device ID is the same as the ID of the local network device and the first packet type is an OAM detection packet.

In an embodiment, the method may further include, if the OAM packet does not meet the preset reply condition, forwarding the OAM packet.

Before the forwarding the OAM packet, the method further includes determining whether the OAM packet meets a preset forwarding condition, and if the OAM packet meets the preset forwarding condition, forwarding the OAM packet.

The first OAM information further includes a first forwarding count value.

The preset forwarding condition includes the first forwarding count value is greater than a preset first threshold and the first sink device ID is not the ID of the local network device.

The forwarding the OAM packet includes subtracting a fixed value from the first forwarding count value, and forwarding the OAM packet. In an embodiment, the first OAM information further includes a first session ID.

The foregoing method may further include determining whether the OAM packet meets a preset reply packet confirmation condition, and if the OAM packet meets the preset reply packet confirmation condition, performing corresponding processing according to the OAM packet.

For example, the reply packet confirmation condition may include the first sink device ID is the same as the ID of the local network device, the first packet type is an OAM detection reply packet, and the first session ID is the same as a session ID included in the OAM detection packet initiated by the local network device.

An implementation principle and a technical effect that are of the foregoing method executed by the network device 600, which is enabled by executing, by the processor, the execution instruction, are similar to those of the method described in the previous embodiment, and specific implementation details are not described herein again. In addition, this embodiment of the present disclosure further provides a computer-readable medium, including a computer execution instruction. The computer execution instruction can enable the network device 600 to execute the method described in this embodiment of the present disclosure, an implementation principle and a technical effect that are of the network device 600 are similar to those in the previous embodiment, and details are not described herein again.

The following describes, using a specific example, an OAM packet processing method, a network device, and a system provided in the embodiments of the present disclosure.

An exemplary network system includes a network device S1, a network device S2, a network device S3, and a network device S4, where S2 is communicatively connected to both S1 and S3, and S3 is further communicatively connected to S4. The network devices already include forwarding flow table entries that match an uplink traffic flow and a downlink traffic flow, and the uplink traffic flow and the downlink traffic flow are being in normal communication. At this moment, if it is required to detect in real time whether communication of the uplink traffic flow between S1 and S4 is normal, a periodic connectivity detection OAM session may be initiated.

Forwarding flow table entries that match the uplink traffic flow are shown in the following table 3.

TABLE 3

| Network device | Flow table entry number | Matching field | Action |
| --- | --- | --- | --- |
| S1 | E11 | Destination MAC = 00:1A:CA:00:C5:DA Destination IP = 192.168.20.35 | Perform outputting from a port 1 |
| S2 | E21 | Destination MAC = 00:1A:CA:00:C5:DA Destination IP = 192.168.20.35 | Perform outputting from a port 3 |
| S3 | E31 | Destination MAC = 00:1A:CA:00:C5:DA Destination IP = 192.168.20.35 | Perform outputting from a port 4 |

Forwarding flow table entries that match the downlink traffic flow are shown in the following table 4.

TABLE 4

| Network device | Flow table entry number | Matching field | Action |
| --- | --- | --- | --- |
| S4 | E42 | Destination MAC = 00:1A:CA:00:C5:DC Destination IP = 192.168.10.25 | Perform outputting from the port 3 |
| S3 | E32 | Destination MAC = 00:1A:CA:00:C5:DC Destination IP = 192.168.10.25 | Perform outputting from a port 2 |
| S2 | E22 | Destination MAC = 00:1A:CA:00:C5:DC Destination IP = 192.168.10.25 | Perform outputting from the port 2 |

1. S1 fills OAM information in a connectivity detection packet in an IP packet header of the connectivity detection packet, and sends an IP packet to S2 using the port 1, where the OAM information in the connectivity detection packet may include an OAM version (0x01), a forwarding count value (255), a packet type (connectivity detection), a source device ID (S1), a sink device ID (S4), and a session ID (0001).

The IP packet further carries a source MAC address (00:1A:CA:00:C5:DC), a source IP address (192.168.10.25), a destination MAC address (00:1A:CA:00:C5:DA), and a destination IP address (192.168.20.35).

2. S2 receives the IP packet, obtains the connectivity detection packet after parsing the IP packet, determines that the packet version is supported, subtracts 1 from the forwarding count value (to obtain 254), detects that the sink device ID is not S2 (which meets a forwarding condition), and forwards the connectivity detection packet to S3 using the port 3.

3. The S3 receives the IP packet, obtains the connectivity detection packet after parsing the IP packet, determines that the packet version is supported, subtracts 1 from the forwarding count value (to obtain 253), detects that the sink device ID is not S3 (which meets the forwarding condition), and forwards the connectivity detection packet to S4 using the port 4.

4. S4 receives the IP packet, obtains the connectivity detection packet after parsing the IP packet, determines that the packet version is supported, subtracts 1 from the forwarding count value (to obtain 252), detects that the sink device ID is S4 and the connectivity detection packet meets a reply condition, generates a connectivity detection reply packet, fills OAM information in the connectivity detection reply packet in an IP packet header of the connectivity detection reply packet, and sends an IP packet to S3 using the port 3, where the OAM information in the connectivity detection reply packet includes an OAM version (0×01), a forwarding count value (255), a packet type (connectivity detection reply), a source device ID (S4), a sink device ID (S1), and a session ID (0001).

S4 needs to reverse both MAC addresses and IP addresses that are of the IP packet sent by S1, where the IP packet in the connectivity detection reply packet sent by S4 carries a source MAC address (00:1A:CA:00:C5:DA), a source IP address (192.168.20.35), a destination MAC address (00:1A:CA:00:C5:DC), and a destination IP address (192.168.10.25).

5. After being forwarded by S2 and S3, the connectivity detection reply packet arrives at S1, where a forwarding process of the connectivity detection reply packet is not described in detail again.

6. S1 receives the IP packet, obtains the connectivity detection reply packet after parsing the IP packet, determines that the packet version is supported, subtracts 1 from the forwarding count value (to obtain 252), detects that the packet type is a connectivity detection reply packet, the sink device ID is S1, and the session ID is the same as the session ID of the locally initiated connectivity detection packet, determines that the connectivity detection reply packet is a reply packet for the connectivity detection packet initiated by S1 and no timeout occurs, and may determine that communication between S1 and S4 is smooth. An OAM session within this period is completed.

It may be learned from descriptions in the foregoing embodiments and the foregoing example that according to the OAM packet processing method, the network device, and the network system, OAM information in an OAM packet is carried in an IP packet header, no special Ethernet protocol type/special destination MAC address/special destination port number is used in the OAM packet, and at a line layer, a network layer, a transport layer, and an application layer, the IP packet header of the IP packet of the OAM packet is the same as that of an IP packet that carries a service packet. In a forwarding path (such as a switch and a router), an identical forwarding entry is used in the OAM packet and the service packet, and if an error occurs in a forwarding entry related to the service packet, a same fault occurs in the OAM packet and the service packet. The fault can be quickly detected using an OAM mechanism, which overcomes a defect in the prior art, thereby improving a fault detection capability in an OAM method.

A person of ordinary skill in the art may understand that all or some of the steps of the method embodiments may be implemented by a program instructing relevant hardware. The program may be stored in a computer-readable memory medium. When the program runs, the steps of the method embodiments are performed. The foregoing memory medium includes any medium that can store program code, such as a read-only memory (ROM), RAM, a magnetic disk, or an optical disc.

The OAM packet processing method, the network device, and the network system according to embodiments of the present disclosure are introduced in detail above. In this specification, specific examples are used to describe the principle and implementation manners of the present disclosure, and the description of the embodiments is only intended to help understand the method and core idea of the present disclosure. Meanwhile, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. An operation, administration and maintenance (OAM) packet processing method implemented at a local network device, wherein the method comprises:
receiving, by a receiver of the local network device, an OAM packet comprising a first Internet Protocol (IP) header, wherein the IP header of the OAM packet comprises a first source device identity (ID) and a first sink device ID; and
returning, by a transmitter of the local network device, an OAM reply packet comprising a second IP header, wherein the second IP header of the OAM reply packet comprises a second source device ID and a second sink device ID, wherein the second source device ID is an ID of the local network device, and wherein the second sink device ID is the same as the first source device ID, wherein information included in the OAM packet and the OAM reply packet improves a fault detection capability of the local network device.

2. The method according to claim 1, wherein before returning the OAM reply packet, the method further comprises determining that the OAM packet meets a preset reply condition, wherein the OAM reply packet further comprises a second packet type, wherein the second packet type is an OAM detection reply packet, wherein the OAM packet further comprises a first packet type, and wherein the preset reply condition comprises the first sink device ID that is the same as the ID of the local network device and the first packet type that is an OAM detection packet.

3. The method according to claim 2, wherein the method further comprises forwarding the OAM packet when the OAM packet does not meet the preset reply condition.

4. The method according to claim 3, further comprising determining that the OAM packet meets a preset forwarding condition before forwarding the OAM packet.

5. The method according to claim 4, wherein the OAM packet further comprises a first forwarding count value, wherein the preset forwarding condition comprises the first forwarding count value that is greater than a preset first threshold and the first sink device ID that is not the ID of the local network device, and wherein the method further comprises subtracting a fixed value from the first forwarding count value before forwarding the OAM packet.

6. A network device, wherein the network device comprises:
a bus;
a processor connected to the bus; and
a memory connected to the bus
wherein the memory is configured to store an execution instruction,
wherein the processor is configured to communicate with the memory and execute the execution instruction to:
receive an operation, administration and maintenance (OAM) packet comprising a first IP packet header, wherein the first IP packet header of the OAM packet comprises a first source device identity (ID) and a first sink device ID; and
return an OAM reply packet comprising a second IP packet header, wherein the second IP packet header of the OAM reply packet comprises a second source device ID and a second sink device ID, wherein the second source device ID is an ID of the network device, and wherein the second sink device ID is the same as the first source device ID, wherein information included in the OAM packet and the OAM reply packet improves a fault detection capability of the network device.

7. The network device according to claim 6, wherein the processor is further configured to determine that the OAM packet meets a preset reply condition, wherein the OAM reply packet further comprises a second packet type, wherein the second packet type is an OAM detection reply packet, wherein the OAM packet further comprises a first packet type, and wherein the preset reply condition comprises the first sink device ID that is the same as the ID of the network device and the first packet type that is an OAM detection packet.

8. The network device according to claim 7, wherein the processor is further configured to forward the OAM packet when the OAM packet does not meet the preset reply condition.

9. The network device according to claim 8, wherein the processor is further configured to determine that the OAM packet meets a preset forwarding condition.

10. The network device according to claim 9, wherein the OAM packet further comprises a first forwarding count value, wherein the preset forwarding condition comprises the first forwarding count value that is greater than a preset first threshold and the first sink device ID that is not the ID of the network device, and wherein the processor is further configured to subtract a fixed value from the first forwarding count value before forwarding the OAM packet.

11. The network device according to claim 6, wherein the OAM packet does not comprise an Ethernet protocol type, a special destination Media Access Control (MAC) address, or a special destination port number.

12. The network device according to claim 6, wherein the OAM reply packet is returned when the OAM packet indicates that the OAM packet is an OAM detection packet.

13. The method according to claim 1, wherein the OAM reply packet does not comprise an Ethernet protocol type, a special destination Media Access Control (MAC) address, or a special destination port number.

14. The method according the claim 1, wherein the OAM packet is received from a source device corresponding to the first source device ID.

15. A network device implemented in a network comprising:
a memory configured to store instructions;
a processor coupled to the memory and configured to execute the instructions to cause the processor to:
receive an operation, administration and maintenance (OAM) packet comprising a first IP packet header, wherein the first IP packet header of the OAM packet comprises a first source device identity (ID) and a first sink device ID; and
return an OAM reply packet comprising a second IP packet header, wherein the second IP packet header of the OAM reply packet comprises a second source device ID and a second sink device ID, wherein the second source device ID is an ID of the network device, and wherein the second sink device ID is the same as the first source device ID, wherein information included in the OAM packet and the OAM reply packet improves a fault detection capability of the local network device.

16. The network device according to claim 15, wherein the OAM reply packet is returned when the OAM packet meets a preset reply condition, and wherein the preset reply condition comprises the first sink device ID that is the same as the ID of the network device and the first packet type that is an OAM detection packet.

17. The network device according to claim 15, wherein the instructions further cause the processor to forward the OAM packet to another network device when the OAM packet does not meet a preset reply condition, and wherein the preset reply condition comprises the first sink device ID that is the same as the ID of the network device and the first packet type that is an OAM detection packet.

18. The network device according to claim 15, wherein the OAM packet further comprises a first forwarding count value, wherein the instructions further cause the processor to determine that the OAM packet meets a preset forwarding condition, and wherein the preset forwarding condition comprises the first forwarding count value that is greater than a preset first threshold and the first sink device ID that is not the ID of the network device.

19. The network device according to claim 15, wherein the OAM packet further comprises a first forwarding count value.

20. The network device according to claim 15, wherein the OAM packet does not comprise an Ethernet protocol type, a special destination Media Access Control (MAC) address, or a special destination port number.

* * * * *